United States Patent
McAllister

(10) Patent No.: US 7,260,187 B1
(45) Date of Patent: Aug. 21, 2007

(54) VOICE RESPONSE APPARATUS AND METHOD OF PROVIDING AUTOMATED VOICE RESPONSES WITH SILENT PROMPTING

(75) Inventor: Alexander I. McAllister, Silver Spring, MD (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/309,274

(22) Filed: May 11, 1999

(51) Int. Cl.
H04M 1/64 (2006.01)
(52) U.S. Cl. ............................. 379/88.04; 379/88.03; 379/88.23
(58) Field of Classification Search .. 379/88.01–88.04, 379/88.18, 88.22, 88.23; 704/256, 257, 275
See application file for complete search history.

(56) References Cited

U.S. PATENT DOCUMENTS

| | | | |
|---|---|---|---|
| 4,348,550 A * | 9/1982 | Pirz et al. ............... | 379/355.06 |
| 4,363,102 A | 12/1982 | Holmgren et al. | |
| 4,656,651 A | 4/1987 | Evans et al. | |
| 4,763,350 A | 8/1988 | Immendorfer et al. | |
| 4,785,408 A | 11/1988 | Britton et al. | |
| 4,805,212 A * | 2/1989 | Hase et al. ................. | 379/359 |
| 4,827,500 A | 5/1989 | Binkerd et al. | |
| 4,827,518 A | 5/1989 | Feustel et al. | |
| 4,837,804 A | 6/1989 | Akita | |
| 4,876,717 A | 10/1989 | Barron et al. | |
| 4,914,692 A | 4/1990 | Hartwell et al. | |
| 4,979,206 A | 12/1990 | Padden et al. | |
| 5,033,088 A | 7/1991 | Shipman | |
| 5,125,024 A | 6/1992 | Gokcen et al. | |
| 5,127,043 A | 6/1992 | Hunt et al. | |
| 5,136,631 A | 8/1992 | Einhorn et al. | |
| 5,165,095 A | 11/1992 | Borcherding | |
| 5,181,237 A | 1/1993 | Dowden et al. | |
| 5,193,110 A | 3/1993 | Jones et al. | |
| 5,199,062 A | 3/1993 | Von Meister et al. | |
| 5,208,848 A | 5/1993 | Pula | |
| 5,274,695 A | 12/1993 | Green | |
| 5,297,183 A | 3/1994 | Bareis et al. | |
| 5,297,194 A | 3/1994 | Hunt et al. | |
| 5,301,227 A * | 4/1994 | Kamei et al. ............ | 379/88.03 |
| 5,353,336 A | 10/1994 | Hou et al. | |
| 5,369,685 A | 11/1994 | Kero | |
| 5,452,340 A * | 9/1995 | Engelbeck et al. ....... | 379/88.03 |
| 5,479,489 A * | 12/1995 | O'Brien ................... | 379/88.03 |
| 5,479,491 A | 12/1995 | Herrero Garcia et al. | |
| 5,517,566 A | 5/1996 | Smith et al. | |
| 5,717,738 A * | 2/1998 | Gammel .................. | 379/88.03 |
| 5,805,672 A * | 9/1998 | Barkat et al. ............ | 379/88.03 |
| 5,832,063 A * | 11/1998 | Vysotsky et al. ........ | 379/88.03 |

(Continued)

Primary Examiner—Fan Tsang
Assistant Examiner—Joseph T Phan

(57) ABSTRACT

A voice response unit (VRU) includes a silent prompt feature in the form of an intentional delay inserted after a message is given to a caller, during which delay the caller may invoke alternative processing or interrupt current processing. If appropriate alternative or interrupt commands are not received during the delay period, then processing continues as provided in accordance with the previously played message. The duration of this silent prompt delay is carefully selected to provide sufficient response time for the caller to request alternative processing, while avoiding a perceptible or objectionable delay to the average caller not requiring alternative processing. Optimally, this delay period should be within a range of one to two and one-half seconds and, preferably, within a range of 1.2 to 2.3 seconds, an optimal time being 1.8 seconds.

62 Claims, 6 Drawing Sheets

U.S. PATENT DOCUMENTS

| | | | | |
|---|---|---|---|---|
| 5,912,949 A | * | 6/1999 | Chan et al. | 379/88.03 |
| 6,021,181 A | * | 2/2000 | Miner et al. | 379/88.02 |
| 6,167,117 A | * | 12/2000 | Will | 379/88.01 |
| 6,260,012 B1 | * | 7/2001 | Park | 704/236 |
| 6,404,876 B1 | * | 6/2002 | Smith et al. | 379/218.01 |
| 6,449,496 B1 | * | 9/2002 | Beith et al. | 455/563 |
| 6,453,020 B1 | * | 9/2002 | Hughes et al. | 379/406.01 |

* cited by examiner

VOICE RESPONSE APPARATUS AND METHOD OF PROVIDING AUTOMATED VOICE RESPONSES WITH SILENT PROMPTING

BACKGROUND OF THE INVENTION

1. Field of the Invention

The present invention relates generally to telecommunications and particularly to voice response platforms and methods.

2. Description of the Related Technology

Voice response units (VRUs) and systems are widely used to replace or supplement human operators and attendants. VRUs provide user access to information using a conventional telephone by providing voice prompts and information. The user accesses the platform using a conventional telephone and interacts using, typically, either the touch tone pad and DTMF signaling or by speaking requests and responses. The VRU, in response, greets callers and provides instructions, prompts, menus, and information to the user using prerecorded or synthesized speech. These voice response units are extensively used by service providers, such as banks, government offices, customer service organizations, etc. to automate telephone call answering, routing and responding to inquiries. VRUs are also used to interface users with other applications, such as voice mail systems and telephone directory services.

VRUs are programmed to provide set responses to particular events and requests. Thus, a VRU may answer an incoming telephone call with a standard greeting followed by a menu or other information describing available choices and sub-menus available to the user together with the appropriate access method. For example, the user may be prompted to enter the number "1" using the telephone touch tone pad to indicate that a first option is desired, the number "2" to select a second option, etc. Alternatively, if the VRU includes a speech recognition capability, the VRU may prompt the user to speak a desired option or to input other information such as the name of a called party. As the VRU interacts with the the user, it will provide information and prompting using appropriate prestored or synthesized voice messages.

As part of the scripting process, some VRUs take into account additional information in selecting an appropriate voice message. For example, some VRUs will greet a caller with a message appropriate to the time of day, day of week, etc. Certain VRUs also take into consideration information obtained about the caller to tailor an appropriate response. For example, once a caller has been identified either through the user entering identifying information such as a Social Security number or automatically through the use of automatic number identification (ANI), the VRU may tailor its scripts and messaging to that user by, for example, incorporating the user's name into the script as appropriate. Other VRUs allow the user to select the types of messages used or automatically attempt to select one of several available scripts appropriate to a particular user. For example, an inexperienced user may manually select detailed instructions for using an unfamiliar system while more experienced users may elect to receive more abbreviated prompts. Alternatively, the system may automatically select an appropriate level of detail based on user response time or the number of erroneous or incomplete responses received from the caller to prior prompts. However, while the system will adapt to a user by providing an appropriate script, the wording of each script is fixed and invariable.

While VRUs have consistently improved the speech quality of prompts and information provided to a user, present systems still fail to fully simulate typical human conversation modalities. For example, while VRUs are used to obtain telephone directory information and provide automatic dialing of telephone numbers, the scripting does not readily adapt to human conventions for handling alternative and exception processing. In particular, conventional VRUs include extensive prompts for a wide variety of processing options. However, before a user can select a desired option, he or she must first access the associated menu and, either wait for the corresponding message and prompts to be played, or manually bypass the announcements by entering a selection prior to completion of the announcements. In either case, the VRU does not provide the type and quality of interactivity expected of a human operator.

Accordingly, a need exists for a more user friendly VRU which provides an improved man-machine interface, enhances user interaction with the system and minimizes user frustration. A further need exists for a VRU which reduces the monotony characteristic of conventional automated response systems. A still further need exists for a VRU capable of simulating typical human conversation modalities and patterns and which can handle alternative processing without requiring the user to access additional menus. A still further need exists for a VRU that can handle normal system uses while accommodating exception processing. A still further need exists for a VRU that provides a wide variety options and alternative processes without impeding or burdening users of primary functionalities of the system.

SUMMARY OF THE INVENTION

The present invention is directed to a voice response unit (VRU) and a method of responding to spoken commands which provides a predetermined silent period after an information message or announcement has been played. During this silent period the user may command the system to perform alternate processing including aborting the default processing but without having been prompted to provide such commands or requiring a confirmation command before performing default processing. Thus, if no alternative processing is requested or commanded by the user, default processing is performed consistent with the prior message or announcement. However, if an alternative processing command or interrupt request is recognized during the delay period, default processing is suspended in favor of the requested option or appropriate error processing. This silent delay period, in effect, constitutes a "silent prompt" during which the user can interrupt processing and initiate alternative processing without accessing a separate menu or receiving verbal prompts from the system for inputting such commands.

The silent delay period is preferably in the range of 1.2 to 2.3 seconds, an optimal period being within the range of 1.5 to 2.0 seconds, an optimal time being approximately 1.8 seconds. The VRU is advantageously included as part of a voice activated dialer which receives speech from a calling party to access and identify a telephone number of a called party. Prior to initiation of dialing, and immediately after announcing the name of the party being called, a silent delay period within the aforementioned ranges is provided to allow the user to abort the default dialing process and, instead, invoke alternative or error processing. The alternative processing may include automatic consideration of other close matches, i.e., "second guesses," to handle processing of called parties with similar sounding names. Error processing may include another opportunity to input the name of the called party.

According to one aspect of the invention, a method of providing voice responses to commands includes steps of receiving a first command and selecting a first processing option in response to the first command. The method further includes providing a voice message indicative of the first processing option selected and providing a silent period of a predetermined duration immediately subsequent to a completion of the step of providing the voice message. Finally, the method selectively (i) initiates alternative processing in response to a receipt of a second command input during the silent delay period or (ii) initiates the first processing option in response to an absence of the second command input for a duration of the silent delay period. Advantageously, a duration of the silent delay period is in the range of 1.2 to 2.3 seconds, a preferable range being 1.5 to 2.0 seconds with an optimal delay of 1.8 seconds. The commands may comprise a variety of signals including a speech input, DTMF, or other formats and protocols.

According to another aspect of the invention, a method of telephone dialing uses a voice activated dialer including a directory of subscriber names and telephone numbers. The method includes the steps of selecting one of the subscribers most closely corresponding to the speech input and providing a speech output corresponding to the selected one of the subscribers. A silent delay period of a predetermined duration is provided immediately subsequent to a completion of provision of the speech output. The method further includes the step of selectively (i) initiating alternative processing in response to a receipt of a command input during the silent delay period or (ii) dialing the telephone number corresponding to the selected one of the subscribers immediately after the delay period and in response to an absence of (i.e., failure to detect) the command input for the duration of the silent delay period. According to a feature of the invention, the command input comprises a DTMF audio signal or, alternatively, a speech input wherein the method further includes the step of listening for the second speech input. The second speech input may include a predetermined spoken command or one of a plurality of predetermined spoken commands.

According to another feature of the invention, the step of listening includes recognizing the second speech input to provide speech content data and comparing the speech content data with a list of alternative processing commands.

According to another feature of the invention, the method includes the steps of receiving a first speech input, recognizing a content of the first speech input, and comparing the content with the directory of names. Further, the command input may include a second speech signal wherein the method further includes a step of listening for the second speech input, receiving it, recognizing a content thereof, and comparing the content with a list of alternative processing commands. The step of providing a speech output may further include retrieving audio data corresponding to the selected one of the subscribers and converting the audio data into a speech output. This conversion step may further include decoding the audio data, concatenating a plurality of phonemes, and/or synthesizing speech from the audio data.

According to yet another feature of the invention, the alternative processing includes providing a speech output corresponding to the telephone number of the selected one of the subscribers. Alternatively, the alternative processing may include providing an alternate telephone number for the selected subscriber, dialing the alternate number and supplying a data signal corresponding to the selected subscriber to a remote system, e.g., a voice mail system (VMS). The data signal may represent the telephone number of the selected subscriber for provision to the VMS to provide for access of the subscriber's voice mailbox on that system.

According to another aspect of the invention, a method of telephone dialing using a voice activated dialer, including a directory of subscriber names and telephone numbers, includes the steps of: receiving a first speech input; recognizing the first speech input to provide first speech content data; selecting one of the subscribers most closely corresponding to the first speech content data; providing a speech output corresponding to the selected one of the subscribers; providing a silent delay period of a predetermined duration within a range of 1.2 to 2.3 seconds immediately subsequent to a completion of the step of providing the speech output; listening for a second speech input during the silent period; recognizing the second speech input to provide second speech content data; and, selectively, (i) initiating alternate processing in response to the second speech content data including an alternate processing command, and, otherwise, (ii) dialing the telephone number corresponding to the selected one of the subscribers immediately after the delay period.

According to another aspect of the invention, a voice response unit includes means for receiving a first command for selecting a first processing option in response to the first command. The unit further includes means for providing a voice message indicative of the first processing option selected, providing a silent delay period of a predetermined duration immediately subsequent to a completion of provision of the voice message, and selectively (i) initiating alternate processing in response to a receipt of a second command input during the silent delay period and (ii) initiating the first processing option in response to an absence of the second command input for a duration of and during the silent delay period.

According to another aspect of the invention, a voice activated dialer includes a memory storing a directory of subscriber names and telephone numbers; comparison means for selecting one of the subscribers most closely corresponding to a first speech input; speech output means for providing a speech output corresponding to a selected one of the subscribers; timer means for providing a silent delay period of a predetermined duration immediately subsequent to a completion of providing the speech output; and control means for selectively (i) initiating alternate processing in response to a receipt of a command input during the silent delay period and (ii) dialing the telephone number corresponding to the selected one of the subscribers immediately after the delay period and in response to an absence of the command input for a duration of and during the silent delay period.

These, together with other objects and advantages which will be subsequently apparent, reside in the details of construction and operation as more fully hereinafter described in the claims, with reference being had to the accompanying drawings forming a part thereof, wherein like numerals refer to like elements throughout.

DETAILED DESCRIPTION OF THE PREFERRED EMBODIMENT

Figure 1:
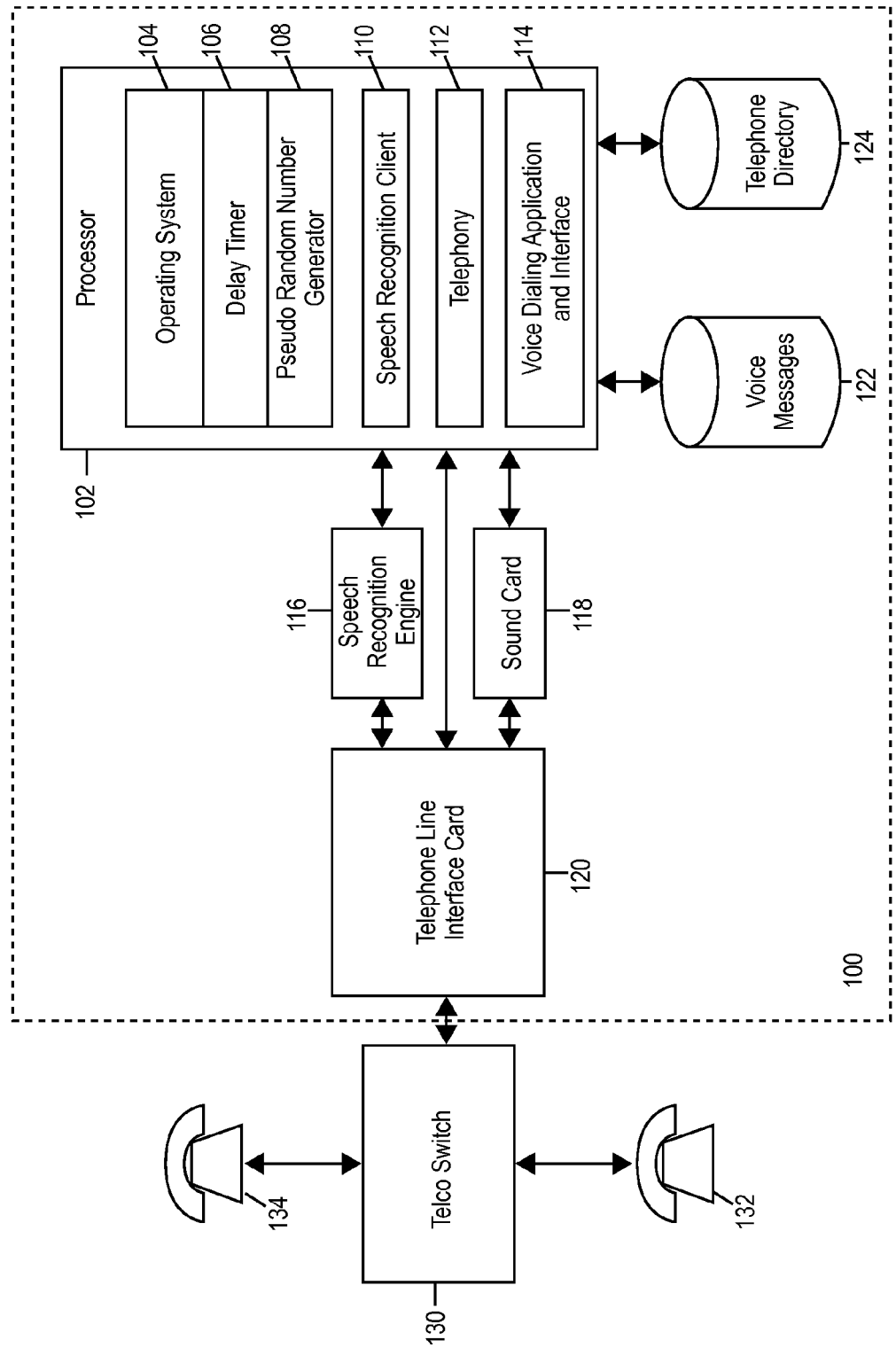
FIG. 1 is a block diagram of a voice response unit including silent prompting for exception processing.

FIG. 1. is a functional block diagram of a voice response unit 100 for providing telephone directory information to a caller and for providing related services including call completion to the named party. VRU 100 includes a processor 102 connected to, controlling, and receiving a recognized speech output from a speech recognition engine 116. Processor 102 is also connected to a sound card 118 for playing and/or synthesizing voice messages to a caller. Telephone line interface card 120, under control of processor 102, supplies an audio output from telephone equipment represented by telco switch 130 to speech recognition engine 116. Sound card 118, in turn, provides a speech audio output to telephone line interface card 120 for transmission to telco switch 130.

Processor 102 further has access to mass storage, conventionally in the form of a hard disk memory, including stored voice messages 122 and telephone directory 124. Processor 102 includes and runs several software systems including a supervisory operating system 104 (including PseudoRandom Number Generator 108), Delay Timer 106, Speech Recognition Client 110, Telephony module 112, and Voice Dialing Application and Interface 114. Conventionally, pseudorandom number generator 108 may be implemented in software as an operating system supplied function, although specialized applications and even hardware implementations are also possible. Also depicted in FIG. 1, for purposes of illustration of the VRU, are calling party 132 connected to telco switch 130 and a called party 134, likewise connected to telco switch 130.

Processor 102 may be a dedicated, specialized central processing unit (CPU) board running specialized software, or may be a general purpose personal computer or workstation running an appropriate operating system such as Windows NT or UNIX. Other suitable platforms include the SUN Sparc20, Pentium 200, Periphonics VAS, IBM RS6000 with direct talk, or the Dialogic Antares card utilizing digital signal processing (DSP) technology.

Delay timer 106 may be a standard operating system-supplied timer or clock function. In one implementation, a call is made to the system clock upon start of the delay, and a program loop continues to read the clock time until (i) a predetermined time has elapsed or (ii) an alternative processing command is received and the loop is exited. Alternatively, a series of nested loops may be used to provide a desired time delay during which an alternative processing command may be received. Delay timer 106 provides a predetermined silent period between announcement of the name or telephone number identified by the system and default dialing of the number. During the silent period the system listens for an alternative command from the user, either in the form of a DTMF signal or, more preferably, by speaking the alternative action requested, such as "stop", "listing", "voice mail", etc.

The selection of an appropriate silent delay period has been found to be critical to user acceptance of the system. Delay periods of less than 1.2 to 1.5 second have been found to be inadequate to signal a user that the system is available to receive an input and provide sufficient reaction time for the user to initiate the request, i.e., speak the alternate command word or words. On the other hand, silences of greater then 2.0 to 2.3 seconds are perceived as processing delays and are unacceptable, particularly to users who are not requesting alternate processing. Accordingly, a silent delay period should be in the range of 1.2 to 2.3 seconds and preferably in the range of 1.5 to 2.0 seconds, the optimal delay being 1.8 seconds. Use of a silent delay in these time ranges results in no perceptible or at least an acceptable delay while providing sufficient opportunity for those users requiring alternative processing to initiate the appropriate actions.

Pseudorandom number generator 108 may be a standard operating system-supplied random number function such as supported by ANSI C. Depending on the particular random function generator supported by the system, the result might need to be scaled to correspond to the number of messages comprising a particular group. For example, if the maximum value provided by the Pseudorandom number function call RAND were equal to RANDMAX and the number of prompts in a group were equal to N, then a Pseudorandom integer J between 1 and N could be obtained using the following code:

$$J=1+(INT)(N*RAND(\ )/RANDMAX));$$

Alternatively, other random number generators may be used, although quality of the randomness is not a major factor in the present embodiment.

In addition to the operating system and Pseudorandom number generator, processor 102 runs software applications and modules written, for example, in "C" code for implementing a particular service, such as a voice dialing application. In this configuration, speech recognition client 110 receives a speech signal from telephone line interface card 120 and performs preprocessing of the speech signal including gross end-pointing and speech buffer management. The speech recognition client 110 further manages the results provided by speech recognition engine 116 to match the phonetic strings with the appropriate names and telephone numbers stored in telephone directory 122. Telephone directory 122 includes three flat database files associated with matching including a names-file, nicknames-files and a phone book.

Telephony application 112 performs call answering, caller ID capture, speech capture, billing information processing and call transfer. The latter function, call transfer, may be provided by using the three-way calling feature of telco switch 130. Using this feature, after an incoming call has been terminated at telephone line interface card 120 and the telephone number of a requested party has been identified, telephone line interface card 120 is instructed by telephony module 112 to perform a switchhook operation to obtain a second dial tone from telco switch 130. The telephone number of the identified called party 134 is then outdialed to initiate a call to that party. Upon ring detection, telephone line interface card 120 performs a second flashhook operation to signal telco switch 130 to bridge calling party 132 and, subsequently, telephone line interface card 120 goes back on hook to drop out of the bridge and wait for the next user to call.

Voice dialing Application and Interface 114 provides system prompts, call error handling, call handling features (i.e., "call completion," "listing," "sent to mailbox," etc.) and manages the speech client recognition results to determine the appropriate response or prompt group of messages.

Stored voice messages 122 are arranged in groups of content equivalent prompts or messages. All of the prompts within a group are interchangeable, conveying substantially the same substance but with variations in wording and/or phraseology and sentence structure to mimic normal variations in human speech. For example, a message group may include five suitable system greetings that might be played to a user when a call is first answered. One prompt may include "Bell Atlantic, who would you like to call?"; a second prompt might be "This is Bell Atlantic, who would you like to call?"; a third prompt "Corporate dialing, who would you like to call?"; a fourth prompt "This is the corporate dialer, who would you like to call?"; and a fifth "Bell Atlantic here, who would you like to call?". Similarly, other message groups would include appropriate messages or prompts to be used in a particular situation, each of the prompts within a particular group being interchangeable with substantially the same content, i.e., content equivalent prompts.

Telephone directory 124 may be a flat file of names, organizations, functions, etc., with their respective telephone numbers or other handling or routing information as appropriate or as required by the particular application.

Speech recognition engine 116 is preferably speaker independent so that there is no requirement for users to train the system to respond to their voices. The basic speech recognition technology is commercially available through several sources including Nuance Communications, Inc. Although shown apart from processor 102, speech recognition engine 116 may be implemented as an application running on processor 102. Upon receipt of a speech signal from telephone line interface card 120, speech recognition client 110 performs preprocessing of the speech signal for speech recognition engine 112 including gross end-pointing and speech buffer management. The buffered speech is processed to extract the phonetic components, match them with the appropriate speech models and return the highest probability string. The matching string is derived from a grammar file. The matching string is then associated with name files forming part of the telephone directory by a speech recognition client 110.

Figure 2:
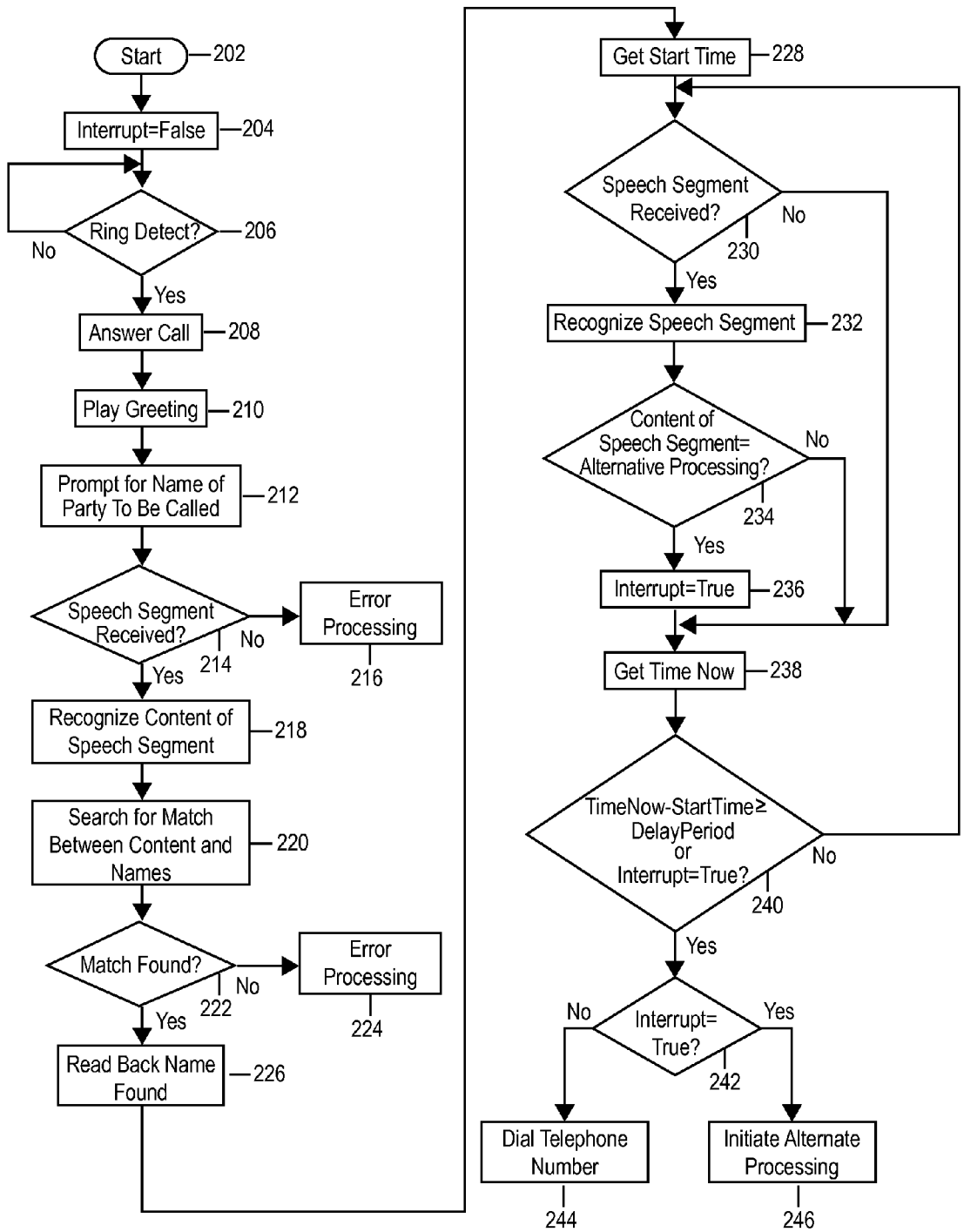
FIG. 2 is a flow processing diagram for a voice response unit implementing a speech dialer including silent prompting.

FIG. 2 is a flow diagram for a voice response unit (VRU) implementing a voice activated dialer. Entering the process at terminal 202, an initialization routine 204 sets an interrupt flag to FALSE. The process includes a loop at decision 206 which is exited upon detection of a ring signal. Upon detecting an incoming call, the call is answered at 208 and an appropriate greeting is played to the caller at 210. The caller is then prompted at process 212 to provide the name of a party to be called. A speech input from the caller is looked for at decision 214 and, if none is found, appropriate error processing is performed at 216. The error processing detail could include prompting the caller to speak louder or to try again. If speech is received at 214, the content of the speech segment is recognized at 218 and a match is attempted at 220 between the recognized speech segment and names present in a telephone directory. If no match is found at decision 222, error processing 224 is performed. Conversely, if a match is found, the name is read back to the caller and a delay segment of code starting at process 228 and ending at decision 240 is entered. Specifically, the time upon entry of the delay is obtained at 228. This time can be obtained from the system under most operating systems and languages. For example, the C library includes the standard time and date functions library <time.h>. Using these functions, a call to time will return the current calendar time which is used as the start time upon entry into the subsequent "While" loop. Another variable such as "timenow" may be used to get the time during loop execution with the function "double difftime (time_t timenow time_t starttime)" used to compute the elapsed time in the loop. Processing continues in the While loop until the delay has expired or an alternative processing command is recognized.

Upon entry into the loop, the decision block 230 is encountered to decide if a speech segment has been received. If not, processing skips down to continue at "Get TimeNow" process 238. A check is then performed at the bottom of the "While" loop to see if either (i) the elapsed time in the loop is equal to or exceeds the predetermined time "Delay Period" or (ii) if the interrupt flag has been set equal to "True," (i.e., an alternative processing command has been recognized). Conversely, if a speech segment has been received, it is recognized at 232 and the resulting content is examined at decision box 234 to determine if alternate processing has been requested. If alternate processing has been recognized, then the interrupt flag is sent to True at 236. Otherwise, the interrupt flag is not altered. Processing then continues at 238 to get the current time. Decision box 240 then decides if the predetermined delay period ("Delay Period") has been achieved or if the interrupt flag is True indicating that alternative processing has been requested, either of which condition causes the process to exit the "While" loop and continue at decision box 242. Alternatively, if the time in the loop has not reached the predetermined "Delay Period" and alternative processing has not been identified, the process loops back to continue at the top of the "While" loop at decision box 230.

Since the loop can be exited by either of two conditions, decision box 242 is necessary to determine if the exit is due to a timeout condition or because alternative processing has been requested. If the exit from the loop is in response to a timeout, then the lefthand branch is taken out of decision box 242 and the telephone number is dialed at 244. Otherwise, alternative processing is initiated at 246.

Figure 3A:
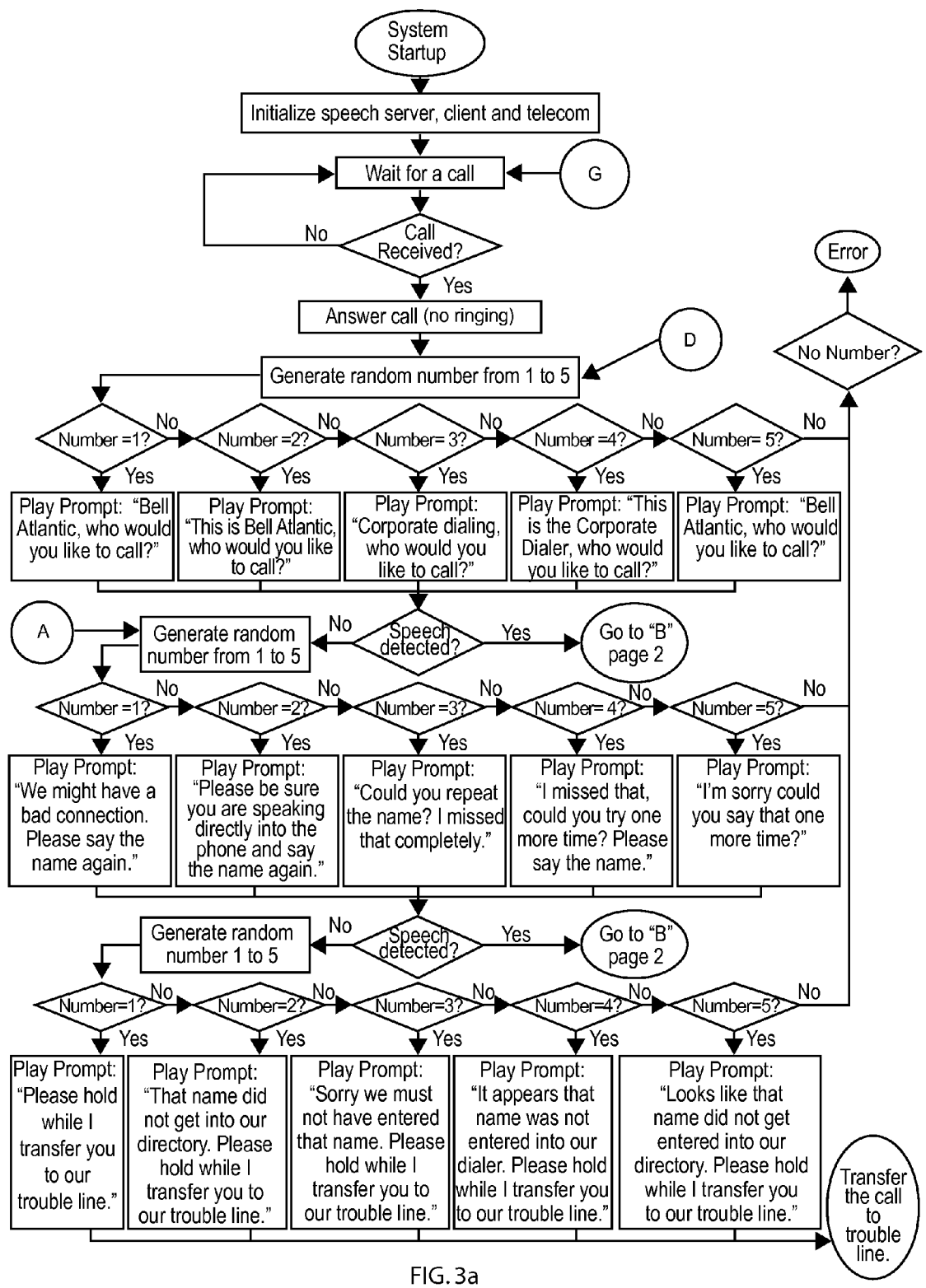
FIGS. 3a-3d are flow processing diagrams for a voice response unit providing telephone directory and call completion services including a silent prompting period.
Figure 3B:
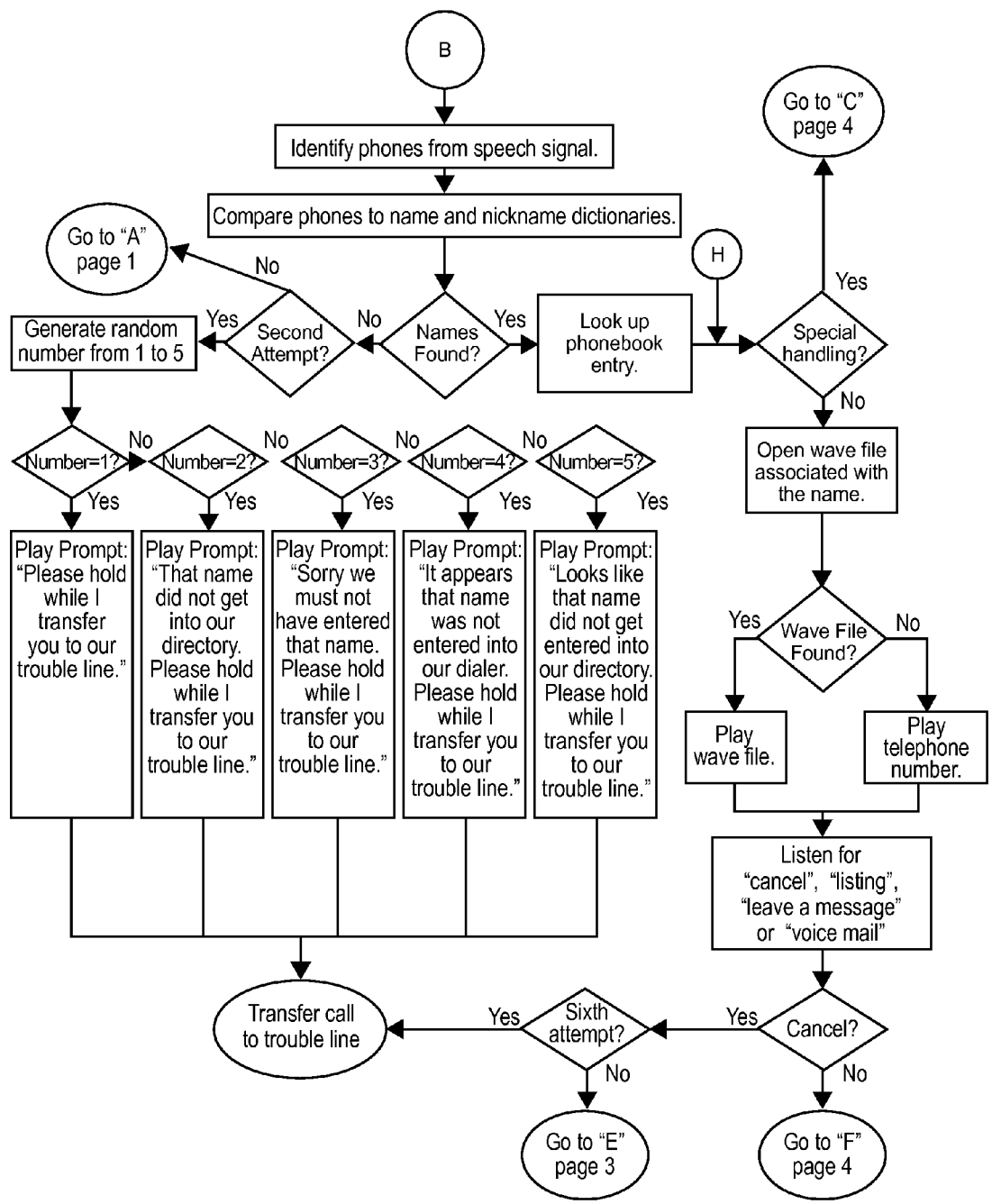
Figure 3C:
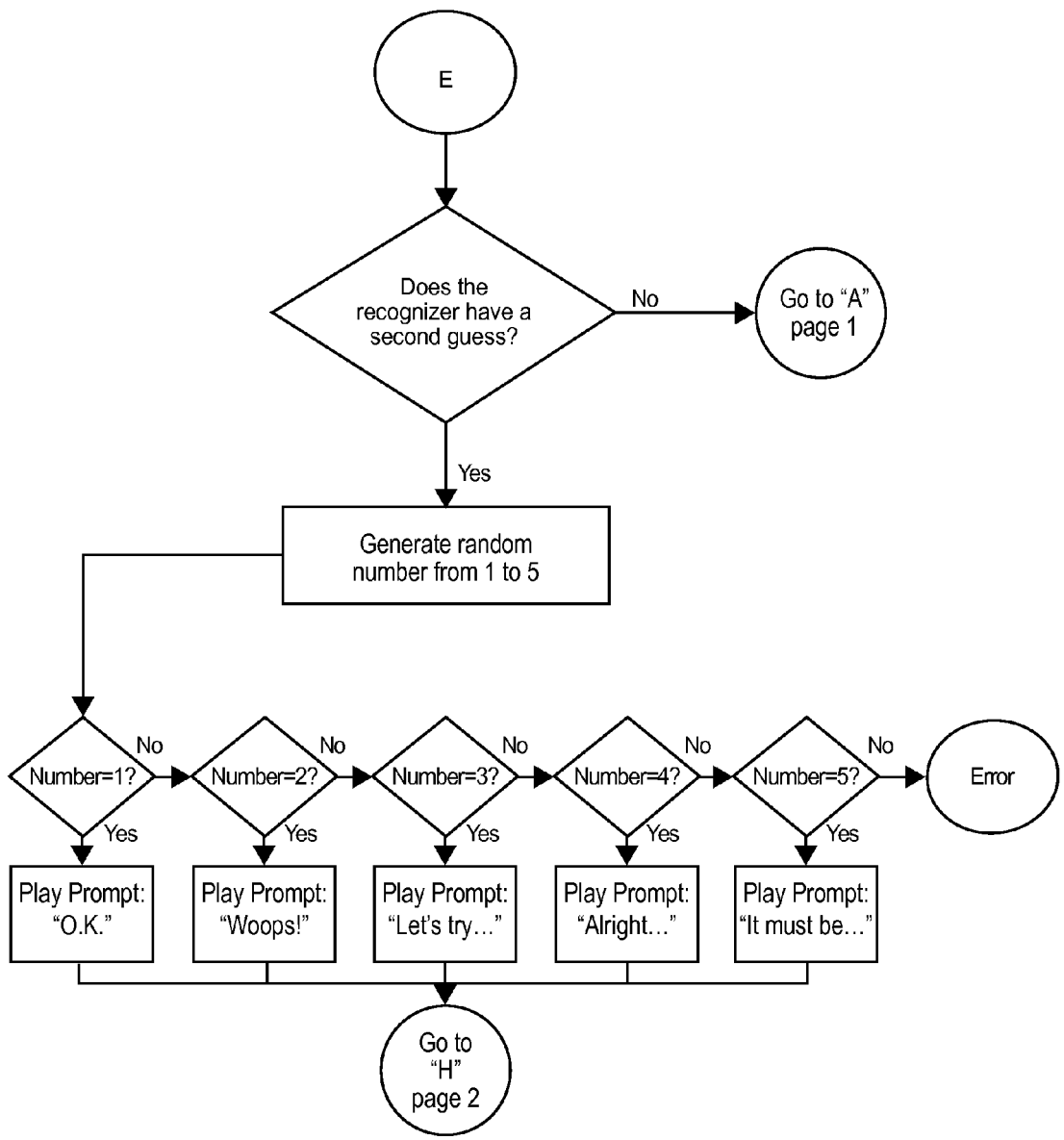
Figure 3D:
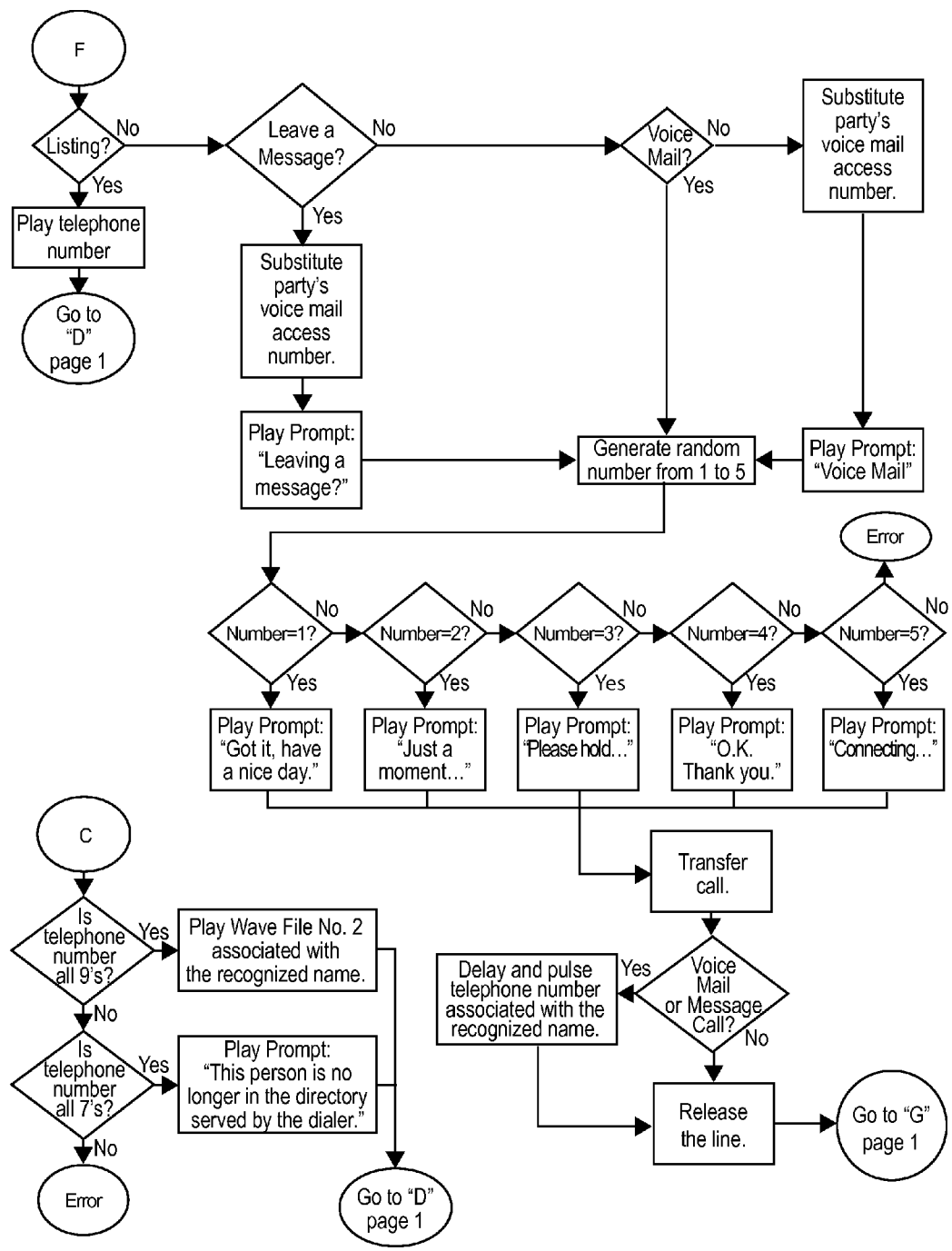

A flow diagram of another automated dialer according to the invention is shown in FIGS. 3a-3d. FIG. 3a shows call processing for call answer and provision of a welcome prompt. Speech recognition processing is further detailed in FIG. 3b. Processing for providing a second guess is shown in FIG. 3c. Finally, normal and special handling processing is shown in FIG. 3d.

Referring to FIG. 3a, at system start-up normal system configuration files are read and initialization of the speech server, client and telecom applications is performed. The program then enters a wait state until an incoming call is received. On detecting ringing, the call is answered by the telephone line interface card 120. A pseudorandom number between 1 and 5 inclusive is generated and used to randomly select one of five content equivalent greetings to be played to the caller. The content equivalent greetings are substantively the same, but vary slightly in wording and phraseology. If no speech is detected within a predetermined period after the greeting has completed, the system will prompt the caller to speak a name of the party to be called. Again, the prompt is selected from among five content equivalent messages in response to a newly generated random number. If, after a second period following this prompt no speech is detected from the calling party, one of five error messages is selected in response to another random number informing the caller that he or she is being transferred to a trouble line.

If speech is detected after the initial greeting or after the caller is prompted, processing continues as shown in the call flow of FIG. 3b. First, the system attempts to identify phonemes from the speech signal of the calling party. The phonemes are then compared to names and nicknames contained in the telephone directory and, if a name is found, the system proceeds to retrieve the associated telephone number. If the telephone number is invalid or is otherwise recognized to require special handling, processing continues as shown at connector C in the lower left of FIG. 3d. For example, if the associated telephone number is all 9's, the WAV file associated with the name is played, but no telephone number is dialed and processing loops back near the beginning of the call flow to play a new greeting and give the caller an opportunity to try another name. Alternatively, if the telephone number is all 7's, the caller is informed that the person named is no longer in the directory served by the system and, again, processing continues back to give the caller the opportunity to lookup another name.

Referring back to FIG. 3b, if the name is found and no special handling is indicated, the system will attempt to open a WAV format audio file associated with the name. If such a WAV file corresponding to the called party's name is found, then the name is played back to the caller as confirmation that the correct directory listing has been identified by the system. Alternatively, if the system is unable to identify a WAV file associated with the found name, the corresponding telephone number is read back to the caller using a synthesized voice. In either case, the system waits for a predetermined time of between one and two and one-half seconds, and preferably within the range of 1.2 seconds to 2.3 seconds, an optimal time being 1.8 seconds, before proceeding to initiate default processing by dialing the telephone number as shown at the top of FIG. 3d. If, during the silent delay period, the system recognizes the caller speak an exception processing command, such as "cancel," "listing," "leave a message," or "voice mail," a flag indicating the appropriate alternative processing is set. If the caller commands the system to cancel dialing by speaking the word "cancel" or any equivalent phrase (e.g., "stop," "no," "wait," "whoa,", etc.) and the system has made less than six attempts toward dialing a number, then processing continues at the top of FIG. 3c. There, if the system recognizer has a second guess (i.e., there as another close match), then a new pseudorandom number is obtained to select one of five error messages to be played to the caller indicating that the system has a second best guess that it will attempt to use. Processing then continues at the entry point shown by connector H in FIG. 3b to check for any special handling requirements as might be indicated by an invalid telephone number for the second guess. If no special handling is required, then the name of the second guess is played (or the corresponding telephone number is no WAV file is found). The system waits for 1.2 to 2.3 seconds for any alternative verbal instructions or processing interruption requests from the caller and, if none is received, dials the number.

If the calling party has indicated that the name or telephone number played is incorrect but the system does not have a second guess, then processing continues at entry point shown by connector A in FIG. 3a, affording the caller a chance to repeat the name or input another name.

If a name has been recognized and the caller has not indicated that the name or telephone number is incorrect, then processing continues at the top of FIG. 3d at connector F. If the caller has spoken the word "listing," or any equivalent recognized by the system (e.g., "number," etc.) during the silent prompt period, then the telephone number corresponding to the found name is played and processing loops back to connector D in FIG. 3a. Special processing is also indicated by the caller speaking "leave a message" during the silent prompt period so that the voice mail telephone number of the called party is substituted for their direct dial number. The calling party is notified by the system they will be "leaving a message," one of five randomly selected closing messages is played, and the call is transferred to the called party's voice mail platform.

If the called party has spoken the phrase "voice mail" during the silent prompt period indicating that they would like to access their own voice mail, then the calling party's voice mail access number is substituted, the message "voice mail" is played and processing continues as before.

If a name and valid telephone number have been identified, and no special processing has been requested, call flow continues in the middle of FIG. 3d to generate a random number used to select one of five closing messages and the call is transferred to the telephone number identified. In the case of a caller having requested his or her own or the voice mail of the called party, the system delays release of the line until it can provide the voice mail platform with the appropriate voice mailbox identification using in-band DTMF signaling or equivalent as shown at the bottom of FIG. 3d.

The silent prompt provides a user friendly interface mimicking human speech modalities. While automated systems have traditionally stepped a user through seemingly endless menus of voice prompts and options, the present invention allows the user to interact much as if talking with a human operator or attendant. The majority of callers allow the system to proceed and process according to its default programming. If the process needs to be interrupted, the user need only so indicate during a short delay period and without accessing further menus.

Although several embodiments of the invention have been described in detail above, it should be clear that the present invention is capable of numerous modifications as would be apparent to one of ordinary skill in the art. Such modifications fall within the purview of the appended claims.

It will be readily seen by one of ordinary skill in the art that the present invention fulfills all of the objects set forth above. After reading the foregoing specification, one of ordinary skill will be able to effect various changes, substitutions of equivalents, and various other aspects of the invention as broadly disclosed herein. It is therefore intended that the protection granted herein be limited only by the definition contained in the appended claims and equivalents thereof.

What is claimed is:

1. A method of providing voice responses to commands comprising the steps of:

receiving a first command;

associating said first command with a subscriber to be called;

selecting a first processing option in response to said first command;

providing a first outgoing voice message indicative of said first processing option selected including identification of said subscriber;

providing a silent delay period of a predetermined duration immediately subsequent to a completion of said step of providing said first outgoing voice message; and selectively (i) initiating alternate processing in response to a receipt of a second command input during said silent delay period, said alternate processing selected from the set of actions consisting of (a) providing spoken listing information for said subscriber, (b) providing a spoken alternate telephone number for said subscriber, (c) receiving and recording an incoming voice message for said subscriber, and (d) forwarding said subscriber to access their voice mail system, and (ii) initiating said first processing option in response to an absence of said second command input for a duration of said silent delay period to thereby initiate a call to said subscriber.

2. The method according to claim 1 wherein said duration of said silent delay period is in a range of 1.2 to 2.3 seconds.

3. The method according to claim 2 wherein said duration of said silent delay period is in a range of 1.5 to 2.0 seconds.

4. The method according to claim 1 further comprising the steps of:
pseudorandomly selecting one of a group of content equivalent messages; and
playing the selected message to provide said first outgoing voice message.

5. The method according to claim 1 wherein said first command comprises a speech input.

6. A method of telephone dialing using a voice activated dialer including a directory of subscriber names and telephone numbers, the method comprising the steps of:
selecting one of said subscribers most closely corresponding to a first speech input;
providing a speech output corresponding to the selected one of said subscribers;
providing a silent delay period of a predetermined duration immediately subsequent to a completion of said step of providing said speech output; and,
selectively
(i) initiating alternate processing in response to a receipt of a command input during said silent delay period, said alternate processing selected from the set of actions consisting of (a) announcing one of said telephone numbers associated with the selected one of said subscribers, (b) announcing an alternate telephone number of said selected one of said subscribers, (c) recording a voice mail for the selected one of said subscribers, and (d) connecting said subscriber to access their voice mail account and
(ii) dialing the telephone number corresponding to the selected one of said subscribers immediately after said delay period and in response to an absence of said command input for a duration of said silent delay period.

7. The method according to claim 6 wherein said duration of said silent delay period is in a range of 1.2 to 2.3 seconds.

8. The method according to claim 7 wherein said duration of said silent delay period is in a range of 1.5 to 2.0 seconds.

9. The method according to claim 6 further comprising the steps of:
pseudorandomly selecting one of a group of content equivalent messages; and
playing the selected message to provide said speech output.

10. The method according to claim 6 wherein said command input comprises a DTMF audio signal.

11. The method according to claim 6 wherein said command input comprises a second speech input and said method further comprises a step of listening for said second speech input.

12. The method according to claim 11 wherein said second speech input comprises a predetermined spoken command.

13. The method according to claim 11 wherein said second speech input comprises one of a plurality of predetermined spoken commands.

14. The method according to claim 11 wherein said step of listening includes recognizing said second speech input to provide speech content data and comparing said speech content data with a list of alternative processing commands.

15. The method according to claim 11 further comprising the steps of:
receiving said first speech input;
recognizing a content of said first speech input; and
comparing said content with said directory.

16. The method according to claim 15 wherein said command input comprises a second speech signal and said method further comprises a step of listening for said second speech input.

17. The method according to claim 16 wherein said step of listening includes the steps of:
receiving said second speech input;
recognizing a content of said second speech input; and
comparing said content with a list of alternative processing commands.

18. The method according to claim 16 wherein said duration of said silent delay period is in a range of 1.2 to 2.3 seconds.

19. The method according to claim 18 wherein said duration of said silent delay period is in a range of 1.5 to 2.0 seconds.

20. The method according to claim 19 wherein said duration of said silent delay period is 1.8 seconds.

21. The method according to claim 16 wherein said step of providing a speech output includes retrieving audio data corresponding to said selected one of said subscribers and converting said audio data into said speech output.

22. The method according to claim 21 wherein said step of converting said audio data into said speech output includes decoding said audio data.

23. The method according to claim 21 wherein said step of converting said audio data into said speech output includes concatenating a plurality of phonemes.

24. The method according to claim 21 wherein said step of converting said audio data into said speech output includes a step of synthesizing speech from said audio data.

25. The method according to claim 6 wherein said alternate processing includes providing a speech output corresponding to the telephone number of said selected one of said subscribers.

26. The method according to claim 6 wherein said alternate processing includes providing an alternate telephone number of said selected one of said subscribers.

27. The method according to claim 26 including dialing said alternate telephone number of said selected one of said subscribers and supplying a data signal corresponding to said selected one of said subscribers to a remote system.

28. The method according to claim 27 wherein said data signal represents said telephone number of said selected one of said subscribers.

29. A method of telephone dialing using a voice activated dialer including a directory of subscriber names and telephone numbers, the method comprising the steps of:
receiving a first speech input;
recognizing said first speech input to provide first speech content data;
selecting one of said subscribers most closely corresponding to said first speech content data;
providing a speech output corresponding to the selected one of said subscribers;
providing a silent delay period of a predetermined duration within a range of 1.2 to 2.3 seconds immediately subsequent to a completion of said step of providing said speech output;

listening for a second speech input during said silent period;
recognizing said second speech input to provide second speech content data; and
selectively
   (i) initiating alternate processing in response to said second speech content data including an alternate processing command, said alternate processing selected from the group of actions consisting of (a) announcing a telephone number of the selected one of said subscribers, (b) identifying and announcing an alternative telephone number of the selected one of said subscribers, and (c) recording a voice mail to the selected one of said subscribers, and, otherwise,
   (ii) dialing the telephone number corresponding to the selected one of said subscribers immediately after said delay period.

30. The method according to claim 29 wherein said predetermined duration of said silent delay period is in a range of 1.5 to 2.0 seconds.

31. The method according to claim 28 further comprising the steps of:
   pseudorandomly selecting one of a group of content equivalent messages; and
   playing the selected message to provide said speech output.

32. A voice response unit comprising:
   means for receiving a first command;
   means for selecting a first processing option in response to said first command including identification of a subscriber to be called;
   means for providing a voice message indicative of said first processing option selected;
   means for providing a silent delay period of a predetermined duration immediately subsequent to a completion of providing said voice message; and
   means for selectively
      (i) initiating alternate processing in response to a receipt of a second command input during said silent delay period, said alternate processing selected from the group of actions consisting of (a) announcing a telephone number of said subscriber, (b) identifying and announcing an alternative telephone number of said subscriber, and (c) recording a voice mail for said subscriber, and
      (ii) initiating said first processing option in response to an absence of said second command input for a duration of said silent delay period to thereby initiate a call to said subscriber at a primary telephone number.

33. The voice response unit according to claim 32 wherein said predetermined duration is in a range of 1.2 to 2.3 seconds.

34. The voice response unit according to claim 33 wherein said predetermined duration is in a range of 1.5 to 2.0 seconds.

35. The voice response unit according to claim 33 wherein said predetermined duration of said silent delay period is 1.8 seconds.

36. A voice activated dialer comprising:
   a memory storing a directory of subscriber names and telephone numbers;
   comparison means for selecting one of said subscribers most closely corresponding to a first speech input;
   speech output means for providing a speech output of one of said subscriber names corresponding to the selected one of said subscribers;
   timer means for providing a silent delay period of a predetermined duration immediately subsequent to a completion of providing said speech output; and
   control means for selectively (i) initiating alternate processing in response to a receipt of a spoken command input during said silent delay period, said alternative processing including recording a voice message for said subscriber, and (ii) calling the telephone number corresponding to the selected one of said subscribers immediately after said delay period and in response to an absence of said command input for a duration of said silent delay period.

37. The voice activated dialer according to claim 36 wherein said duration of said silent delay period is in a range of 1.2 to 2.3 seconds.

38. The voice activated dialer according to claim 37 wherein said duration of said silent delay period is in a range of 1.5 to 2.0 seconds.

39. The voice activated dialer according to claim 36 further comprising:
   selection means for pseudorandomly selecting one of a group of content equivalent messages, wherein said speech output means provides a speech prompt using said selected one of said messages.

40. The voice activated dialer according to claim 36 wherein said command input comprises a DTMF audio signal.

41. The voice activated dialer according to claim 36 wherein said command input comprises a second speech input and said voice activated dialer further speech recognizer means for listening for said second speech input.

42. The voice activated dialer according to claim 41 wherein said speech recognizer means is responsive to a predetermined spoken command.

43. The voice activated dialer according to claim 41 wherein said speech recognizer means is responsive to a plurality of predetermined spoken commands.

44. The voice activated dialer according to claim 41 wherein said recognizer means includes means for processing said second speech input to provide speech content data and means for comparing said speech content data with a list of alternative processing commands.

45. The voice activated dialer according to claim 36 further comprising:
   input means receiving said first speech input;
   speech recognition means for recognizing a content of said first speech input; and
   processing means for comparing said content with said directory.

46. The voice activated dialer according to claim 45 wherein said command input comprises a second speech signal and said voice activated dialer further includes speech recognition means for recognizing said second speech input.

47. The voice activated dialer according to claim 46 wherein said speech recognition means includes:
   an input receiving said second speech input;
   speech processing means for recognizing a content of said second speech input; and
   processor means for comparing said content with a list of alternative processing commands.

48. The voice activated dialer according to claim 47 wherein said duration of said silent delay period is in a range of 1.2 to 2.3 seconds.

49. The voice activated dialer according to claim 48 wherein said duration of said silent delay period is in a range of 1.5 to 2.0 seconds.

50. The voice activated dialer according to claim 49 wherein said duration of said silent delay period is 1.8 seconds.

51. The voice activated dialer according to claim 36 wherein said speech output means includes a memory storing audio data corresponding to said selected one of said subscribers and audio player means for converting said audio data into said speech output.

52. A voice activated dialer comprising:
a memory storing a directory of subscriber names and telephone numbers;
a speech recognition engine receiving a speech input and providing content data derived from said speech input signal;
a processor responsive to said content data for selecting one of said subscribers;
an audio output providing a first outgoing speech signal corresponding to the selected one of said subscribers; and
a timer providing a silent delay period of a predetermined duration immediately subsequent to a completion of providing said first outgoing speech signal,
wherein said processor selectively
(i) initiates alternate processing in response to a receipt of a command input during said silent delay period, said alternate processing selected from the group of actions consisting of (a) providing a second outgoing speech signal corresponding to one of said telephone numbers associated with the selected one of said subscribers, (b) identifying an alternate telephone number associated with the selected one of said subscribers, and (c) recording a voice mail for said selected one of said subscribers, and
(ii) initiates a dialing of the telephone number corresponding to the selected one of said subscribers immediately after said delay period and in response to an absence of said command input for a duration of said silent delay period.

53. The voice activated dialer according to claim 52 wherein said duration of said silent delay period is in a range of 1.2 to 2.3 seconds.

54. The voice activated dialer according to claim 53 wherein said duration of said silent delay period is in a range of 1.5 to 2.0 seconds.

55. A voice activated dialer comprising:
a memory storing a directory of subscriber names and telephone numbers;
a speech recognition engine responsive to a speech input for providing speech content data; and
a processor responsive to said speech content data and to a set of instructions for
(i) selecting one of said subscribers most closely corresponding to first speech content data;
(ii) providing a speech output corresponding to the selected one of said subscribers;
(iii) providing a silent delay period of a predetermined duration within a range of 1.2 to 2.3 seconds immediately after providing said speech output; and
(iv) selectively
(i) initiating alternate processing in response to second speech content data including an alternate processing command selected from the group of commands consisting of (a) providing a second speech output corresponding to one of said telephone numbers associated with the selected one of said subscribers, (b) identifying an alternate telephone number associated with the selected one of said subscribers, and (c) initiating a voice mail to the selected one of said subscribers, and, otherwise, and
(ii) dialing the telephone number corresponding to the selected one of said subscribers immediately after said delay period.

56. The voice activated dialer according to claim 55 wherein said predetermined duration of said silent delay period is in a range of 1.5 to 2.0 seconds.

57. The voice activated dialer according to claim 55 wherein said processor is further responsive to said set of instructions for:
selecting one of a group of content equivalent messages; and
playing the selected message to provide a spoken prompt.

58. A method of providing voice responses to commands comprising the steps of:
receiving a spoken identifier;
attempting recognition of said spoken identifier to identify a subscriber;
selecting a first processing option in connection with said subscriber;
providing a voice message indicative of said first processing option;
providing a silent delay period of a predetermined duration immediately subsequent to a completion of said step of providing a voice message, and selectively
(i) initiating alternate processing in connection with said subscriber in response to a receipt of, and consistent with, a second command input during said silent delay period, said alternate processing selected from the group of actions consisting of (a) announcing a first telephone number associated with the subscriber, (b) announcing an alternate telephone number associated with the subscriber, and (c) initiating a voice mail to the subscriber, and
(ii) initiating said first processing option in connection with said subscriber in response to an absence of said second command input for a duration of said silent delay period.

59. A method of telephone dialing using a voice activated dialer including a directory of subscriber names and telephone numbers, the method comprising the steps of:
selecting one of said subscribers most closely corresponding to a first speech input;
providing a first speech output corresponding to the selected one of said subscribers;
providing a silent delay period of a predetermined duration immediately subsequent to a completion of said step of providing a speech output; and
selectively
(i) initiating alternate processing related to the selected one of the subscribers in response to a receipt of a command input identifying said alternate processing during said silent delay period, said alternate processing selected from the group of actions consisting of (a) providing a second speech output corresponding to one of said telephone numbers associated with the selected one of said subscribers, (b) identifying an alternate telephone number associated with the selected one of said subscribers, and (c) initiating a voice message to said selected one of said subscribers, and
(ii) dialing the telephone number corresponding to the selected one of said subscribers immediately after said delay period and in response to an absence of said command input for a duration of said silent delay period.

60. A method of telephone dialing using a voice activated dialer including a directory of subscriber names and telephone numbers, the method comprising the steps of:
  receiving a first speech input;
  recognizing said first speech input to provide first speech content data;
  selecting one of said subscribers most closely corresponding to said first speech content data;
  providing a first speech output corresponding to the selected one of said subscribers;
  providing a silent delay period of a predetermined duration within a range of 1.2 to 2.3 seconds immediately subsequent to a completion of said step of providing a speech output;
  listening for a second speech input during said silent period;
  recognizing said second speech input to provide second speech content data; and selectively
    (i) initiating alternate processing related to the selected one of said subscribers in response to said second speech content data including an alternate processing command, said alternate processing selected from the group of actions consisting of (a) providing a second speech output corresponding to one of said telephone numbers associated with the selected one of said subscribers, (b) identifying an alternate telephone number associated with the selected one of said subscribers, (c) receiving a message for the selected one of said subscribers, and (d) initiating a voice mail to the selected one of said subscribers, and, otherwise,
    (ii) dialing the telephone number corresponding to the selected one of said subscribers immediately after said delay period.

61. The method according to claim 60 wherein said error processing includes the steps of:
  prompting for a third speech input;
  performing speech recognition of said third speech input to reselect a designated subscriber;
  playing a voice message indicative of said first processing option in connection with said reselected designated subscriber;
  providing a second silent delay period immediately subsequent to a completion of said playing step in connection with said reselected designated subscriber; and
  selectively (i) identifying a third processing option specified by a fourth speech input and, in response, automatically initiating said third processing option in connection with said reselected designated subscriber (ii) automatically initiating said first processing option in connection with said reselected designated subscriber is response to an absence of said fourth speech input during said second silent period.

62. The method according to claim 61 further comprising the steps of:
  dialing a telephone number of said reselected designated subscriber in response to said step of automatically initiating said first processing option; and
  performing said third processing in response to said step of automatically initiating said third processing option, said third processing selected from the group consisting of (i) providing a listing of said reselected designated subscriber, (ii) leaving a message for said reselected designated subscriber, and (iii) accepting a voice mail for said reselected selected subscriber.

* * * * *